(12) United States Patent
Brunel et al.

(10) Patent No.: US 7,376,203 B2
(45) Date of Patent: May 20, 2008

(54) METHOD FOR TRANSMITTING UNIFORMLY DISTRIBUTED DATA IN A MIMO TELECOMMUNICATION SYSTEM

(75) Inventors: Loic Brunel, Rennes Cedex 7 (FR); Nicolas Gresset, Rennes Cedex 7 (FR); Joseph Boutros, Paris (FR)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 188 days.

(21) Appl. No.: 11/290,478

(22) Filed: Dec. 1, 2005

(65) Prior Publication Data

US 2006/0188036 A1    Aug. 24, 2006

(30) Foreign Application Priority Data

Dec. 13, 2004   (EP)   .................. 04292980

(51) Int. Cl.
*H04L 27/00* (2006.01)
*H04B 1/02* (2006.01)

(52) U.S. Cl. .................. 375/299; 455/101
(58) Field of Classification Search ............ 375/267, 375/299, 260, 295; 455/101, 132; 370/208–210
See application file for complete search history.

(56) References Cited

U.S. PATENT DOCUMENTS

| | | | |
|---|---|---|---|
| 6,356,528 B1 | 3/2002 | Lundby et al. | |
| 6,473,467 B1 * | 10/2002 | Wallace et al. | 375/267 |
| 2005/0095996 A1 * | 5/2005 | Takano | 455/91 |
| 2005/0152266 A1 * | 7/2005 | Hwang et al. | 370/210 |
| 2006/0036924 A1 * | 2/2006 | Ghosh | 714/755 |
| 2006/0104379 A1 * | 5/2006 | Li et al. | 375/267 |
| 2006/0159188 A1 * | 7/2006 | Izumi | 375/260 |
| 2006/0203935 A1 * | 9/2006 | Li et al. | 375/299 |
| 2007/0041457 A1 * | 2/2007 | Kadous et al. | 375/260 |

FOREIGN PATENT DOCUMENTS

| | | |
|---|---|---|
| EP | 1 511 212 A1 | 3/2005 |
| EP | 1-770892 A2 * | 3/2005 |

OTHER PUBLICATIONS

Sumeet Sandhu, et al, "Space-Frequency Bit-Interleaved Coded Modulation for MIMO-OFDM/OFDMA Systems"; IEEE 802.16 Broadband Wireless Access Working Group; Nov. 4, 2004; XP002332928; Retrieved from the Internet: URL:http://www.ieee802.org/16/tge/contrib/C80216e-04_04_533.pdf>; 6 pages.

(Continued)

*Primary Examiner*—Tesfaldet Bocure
(74) *Attorney, Agent, or Firm*—Oblon, Spivak, McClelland, Maier & Neustadt, P.C.

(57) ABSTRACT

A method for transmitting data using Nt transmitting antennas over communication channels featuring Ni inputs. The method includes a bit interleaving step including demultiplexing a frame of encoded data bits into a number of bit sequences equal to the predefined number Ni of channel inputs, permutating the bits of each bit sequence produced by the demultiplexing step, forming groups of Nt interleaved bit sequences successively produced by the sequence permutating step, all sequences of a same group being intended to be transmitted through Nt channels allocated to a same bit rank for all transmitting antennas.

14 Claims, 5 Drawing Sheets

OTHER PUBLICATIONS

Atul Salvekar, et al. "Multiple-Antenna Technology in WiMAX Systems"; Intel Technology Journal; vol. 8; No. 3; Aug. 20, 2004; XP002332929; ISSN: 1535-864: Retrieved from the Internet URL:ftp://download.intel.com/technology/itj/2004/volume08issue03/art05_multiantenna/vol18_art05.pdf>; pp. 229-240.

Sumeet Sandhu, et al. "Space-Frequency Bit-Interleaved Coded Modulation for MIMO-OFDM/OFDMA Systems"; IEEE 802.16 Broadband Wireless Access Working Group; Nov. 4, 2004; XP002332928; Retrieved from the Internet: URL:http://www.ieee802.org/16/tge/contrib/C80216e-04_533.pdf>; 6 pages.

Atul Salvekar, et al. "Multiple-Antenna Technology in WiMAX Systems"; Intel Technology Journal; vol. 8; No. 3; Aug. 20, 2004; XP002332929; ISSN: 1535-864; Retrieved from the Internet: URL:ftp://download.intel.com/technology/itj/2004/volume08issue03/art05_multiantenna/vol18_art05.pdf>; pp. 229-240.

* cited by examiner

METHOD FOR TRANSMITTING UNIFORMLY DISTRIBUTED DATA IN A MIMO TELECOMMUNICATION SYSTEM

RELATED APPLICATIONS

This application claims priority to European application No. 04 2929880.2 filed on Dec. 13, 2004.

BACKGROUND OF THE INVENTION

1. Field of the Invention

The present invention relates to a method for transmitting data in a telecommunication system including at least one transmitter provided with a plurality of transmitting antennas and at least one receiver provided with at least one receiving antenna, which method includes a bit encoding step for generating encoded data bits, a bit interleaving step for permutating said encoded data bits, and a modulation step for producing symbols representative of the permutated bits, each symbol being represented by a predetermined number of bits intended to be transmitted over communication channels established between the transmitting and receiving antennas.

2. Related Art

Telecommunication systems in which a plurality of antennas are used at a receiver end and/or at a transmitter end of a wireless link are called Multiple Input Multiple Output systems (further referred to as MIMO systems). MIMO systems have been shown to offer large transmission capacities compared to those offered by single antenna systems. In particular, MIMO capacity increases linearly with the number of transmitting or receiving antennas, whichever the smallest, for a given Signal-to-Noise Ratio and under favourable uncorrelated channel conditions. MIMO techniques are thus likely to be used in future wireless systems intended to provide large spectral efficiencies or, alternatively, reduce the transmitting power required for obtaining a spectral efficiency equivalent to that which is obtained in current telecommunication systems. Such MIMO techniques will very likely be combined with multi-carrier modulation techniques like OFDM (standing for Orthogonal Frequency Division Multiplex) and MC-CDMA (standing for Multi-Carrier-Code Division Multiple Access) techniques, whose use in future wireless systems is also considered.

A particular type of MIMO systems makes use of a Bit Interleaved Coded Modulation technique, further referred to as BICM, according to which the transmitter includes a channel encoder intended to apply an encoding, e.g. by means of a convolutional code or of a turbo code, to uncoded data bits, and to provide an encoded bit stream to an interleaver. This interleaver will then deliver permutated bits, which are to be divided into word sequences intended to be transformed into a series of coded symbols represented each by a plurality of bits, the bits representing a same symbol being intended to be transmitted during a same time interval, called symbol period, by respective transmitting antennas.

Transmitted symbols are to be decoded on the receiver end, which is usually performed in MIMO systems of the BICM type by means of an iterative space-time decoder, which decoder is intended to produce estimates of coded bits constituting the transmitted symbols. The spatial diversity induced by the use of multiple transmitting and receiving antennas eases such a decoding, since this diversity provides a larger amount of information than that which would be provided by a single signal transmitted through a single communication channel.

BRIEF SUMMARY OF THE INVENTION

The dispatching of the superframe may be carried out simply by allocating any two consecutive bits of the superframe to two different tranmitting antennas, but also by allocating any two consecutive bits of the superframe to two different blocks of sequences, both solutions ensuring that the bits included in the superframe will be uniformly distributed over all channel realizations.

The inventors have observed that increasing the diversity of input data provided to a space-time decoder enables said decoder to converge towards more reliable estimates of the coded bits on the basis of which said data has been generated. This may be construed as obtaining better decoding performance by feeding the decoder with data having a higher quality, i.e. a richer content.

The highest diversity which may be perceived at the receiver end of a MIMO system is determined, on the one hand, by a space-related property of the system, i.e. by the number of receiving antennas, and, on the other hand by time-related properties of the system, i.e. the number of different communication channel states occurring during transmission of a given codeword or a minimum code distance. The minimum code distance is defined by a threshold number of bit differences between two codewords beneath which threshold said codewords are identical.

The maximum obtainable diversity may thus be expressed in the form of a product between the number of receiving antennas and the lowest value of the above-described time-related parameters.

Current interleaving techniques do not enable to use to its full extent the diversity theoretically offered by MIMO systems, since consecutive bit sequences delivered by known interleavers and intended to be transmitted during a same symbol period usually include bits which were adjacent to each other within the original encoded bit stream, which reduces the time-related diversity of the data sent to the receiver and in turn limits the performance of the space-time decoder included in this receiver.

The invention aims at solving the aforementioned problem, by providing a method for transmitting data in a MIMO system, which method involves an interleaving scheme enabling to use to its full extent the diversity theoretically offered by such a system, with respect to both space and time, of the data intended to be decoded at the receiver end of this system.

Indeed, a method according to the opening paragraph is characterized according to the invention in that, the communication channels featuring a predefined number Ni of channel inputs, the bit interleaving step includes:

a bit demultiplexing step for dispatching a frame of encoded data bits into a number of bit sequences equal to the predefined number Ni of channel inputs, a sequence interleaving step for permutating the bits of each bit sequence produced by the demultiplexing step, and a sequence allocation step for forming groups of Nt interleaved bit sequences successively produced by the sequence interleaving step, all sequences of a same group being intended to be transmitted through Nt channels allocated to a same bit rank for all transmitting antennas.

The invention enables to compound the spatial diversity obtained by the use of multiple communication channels established between the transmitting and receiving antennas with a high diversity with respect to time of the data transmitted through said channels.

The invention ensures, by virtue of the demultiplexing step, an essentially homogeneous distribution of the encoded data bits over the different channel inputs, which ensures that successive bits will be transmitted over different channel realizations, and thus favours data diversity as perceived at the receiver end of a telecommunication system in which a method according to the invention is used.

The sequence interleaving step will preferably be carried out in such a way that Li successive bits belonging to a same demultiplexed sequence end up included in Li different and equal-sized subdivisions of said sequence after execution of the sequence interleaving step.

Such a preferred embodiment of the invention enables optimal de-correlation of successive uncoded bits, which might otherwise stay linked together in cases where the bit encoding technique makes use of a convolutional code, according to which technique a same uncoded information bit is involved in the generation of L.n successive encoded bits, n being the number of encoded bits delivered by a convolutional channel encoder when said encoder is fed with a given number k of successive uncoded bits and L being a code constraint length. The inventors have observed that the use of such a variant of the invention may enable an essentially homogeneous distribution on all channel inputs and a mapping on different symbol periods of a given number of consecutive encoded bits, which given number is a function of Li and Ni and will be greater than or equal to L.n provided Li is properly chosen. Furthermore, this variant of the invention may be implemented at a relatively low cost by means of a plurality of identical and easily built interleaving modules.

According to a first variant of the invention, the bit sequence interleaving step includes:

a random bit permutation step for randomly permutating all bits included in each sequence produced by the demultiplexing step, a sequence storing and segmenting step for memorizing all permutated sequences produced by the random bit permutation step and dividing said sequences into segments including each a number of bits equal to the predefined number Ni of channel inputs, a segment permutation step for simultaneously applying permutations to segments of different permutated sequences produced by the sequence storing and segmenting step, so that two bits having identical positions within two respective segments included in any group of Ni segments end up having differentiated bit positions in corresponding respective permutated segments, and a concatenation step for reassembling all shifted segments related to a same initial permutated sequence into an interleaved sequence.

The segment permutation step carried out in this first variant of the invention enables to compensate for a vulnerability to errors which is heterogeneous from one bit of a mapping constellation to be used for transposing the encoded bits into modulated symbols. Indeed, if said constellation is represented graphically, it appears that, if one chooses an initial symbol represented by an initial point of the constellation and having for label a set of bits to be transmitted over the communication channels, it appears that modifying the value of a first or of a second one of said bits will lead to respective first or second points located at different first and second distances with respect to the initial point. The segment permutation step tends to redistribute the different bits to be transmitted over changing bit weights, and thus to homogenize the vulnerability to errors featured by the various bits.

In an advantageous embodiment of the invention, the segment permutation step will be carried out by simultaneously applying permutations to segments of different permutated sequences produced by the sequence storing and segmenting step, so that each shifted segment ends up shifted by one bit with respect to its adjacent segments.

This embodiment enables to implement the segment permutation step by means of simple components, such as shifting registers.

In a preferred embodiment of this first variant of the invention, one of the segments of a given permutated sequence produced by the interleaving step will remain unchanged during the segment permutation step, corresponding segments of each jth other permutated sequence being then simultaneously shifted by j bits.

This embodiment requires a limited number of sequence-shiftings while producing the above-mentioned advantages in terms of diversity, and is thus remarkable for its efficiency.

If the permutated sequences produced by the bit interleaving step are to be directly transmitted once the modulation step has been carried out, the predefined number Ni of channel inputs will be chosen equal to a product M.Nt between the number M of bits representative of a symbol and the number Nt of transmitting antennas.

Alternatively, if the modulation step is followed by a space-time encoding step in the course of which bits of K successive symbols are to be combined together before transmission by means of the Nt transmitting antennas, the predefined number Ni of channel inputs is chosen equal to M.K, where M is the number of bits representative of any given symbol.

According to a second variant of the invention, which may be used alternatively or cumulatively with the first variant described above when the communication channels are expected to feature Nc successive sets of physical properties, the encoded data bits produced by the encoding step form a superframe to be dispatched into Nc blocks of Ni sequences each in the course of the bit demultiplexing step.

Communication channels which are expected to successively feature different sets of communication conditions over successive symbol periods are called block-fading channels. Such block-fading channels are essentially invariant for the duration of each set of communication conditions, and the inventors have observed that bits transmitted during time slots corresponding to different blocks have in theory no chance of interfering with each other. This allows to summarily dispatch a superframe into blocks of sequences, the sequences of each block being then processed more cautiously since the bits included in sequences belonging to a same block will be able to interfere with each other during a same invariance period of the block-fading channels. This simple dispatching of the superframe followed by a more constraining block-per-block processing thus enables optimal allocation of processing ressources.

The dispatching of the superframe may be carried out simply by allocating any two consecutive bits of the superframe to two different transmitting antennas, but also by allocating any two consecutive bits of the superframe to two different blocks of sequences, both solutions ensuring that the bits included in the superframe will be uniformly distributed over all channel realizations.

According to a third variant of the invention, the bit demultiplexing step will not be carried out by simply placing each jth encoded bit of an initial frame, modulo Ni, in a corresponding bit sequence, but instead by placing two encoded bits separated by Ni−1 other encoded bits in different bit sequences.

Such a variant of the bit demultiplexing step enables to place consecutive encoded bits over different demultiplexed sequences according to a scheme which is not dictated by a structure of the code used for originally encoding the encoded bits. More particularly, if a specific bit has a high potential for being affected by an encoding error, said specific bit having then a period of occurrence dictated by the code structure, said periodic bit will not always be transmitted through a same channel input, the above described preferred embodiment of the bit demultiplexing step instead ensuring that different occurrences of this periodic bit will be sent through different channel inputs.

According to a preferred embodiment of this third variant, the bit demultiplexing step is carried out by placing an encoded bit of rank j in a bit sequence of rank j+IP((j−1)/Ni), modulo Ni, where IP((j−1)/Ni) represents an integer part of a ratio (j−1)/Ni.

According to one of its hardware-oriented aspects, the invention also relates to a telecommunication system including at least one transmitter provided with a plural number Nt of transmitting antennas and at least one receiver provided with at least one receiving antenna, which transmitter includes bit encoding means for generating encoded data bits, bit interleaving means for permutating said encoded data bits, and modulation means for producing symbols representative of the permutated bits, each symbol being represented by a predetermined number of bits intended to be transmitted over communication channels established between the transmitting and receiving antennas, which channels feature a predefined number Ni of channel inputs, system characterized in that the bit interleaving means include:

bit demultiplexing means for dispatching a frame of encoded data bits into a number of bit sequences equal to the predefined number Ni of channel inputs, sequence interleaving means for permutating the bits of each bit sequence produced by the demultiplexing means, and sequence allocation means for forming groups of Nt interleaved bit sequences successively produced by the sequence interleaving means, all sequences of a same group being intended to be transmitted through Nt channels allocated to a same bit rank for all transmitting antennas.

According to a first variant of such a telecommunication system, which enables to place consecutive encoded bits over different symbol periods according to a scheme which is not dictated by a structure of the code used for originally encoding the encoded bits, the sequence interleaving means include:

random bit permutation means for randomly permutating all bits included in each sequence produced by the demultiplexing step, sequence storing and segmenting means for memorizing all permutated sequences produced by the random bit permutation means and dividing said sequences into segments including each a number of bits equal to the predefined number Ni of channel inputs, segment permutation means for simultaneously permutating segments of different permutated sequences produced by the sequence storing and segmenting means, so that two bits having identical positions within two respective segments included in any group of Ni segments end up having differentiated bit positions in corresponding respective permutated segments, and concatenation means for reassembling all shifted segments related to a same initial permutated sequence into an interleaved sequence.

According to another of its hardware-related aspects, the invention also relates to a communication device provided with a plural number Nt of transmitting antennas, which transmitter includes bit encoding means for generating encoded data bits, bit interleaving means for permutating said encoded data bits, and modulation means for producing symbols representative of the permutated bits, each symbol being represented by a predetermined number of bits intended to be transmitted over communication channels established between the transmitting and receiving antennas, which channels feature a predefined number Ni of channel inputs, device characterized in that the bit interleaving means include:

bit demultiplexing means for dispatching a frame of encoded data bits into a number of bit sequences equal to the predefined number Ni of channel inputs, sequence interleaving means for permutating the bits of each bit sequence produced by the demultiplexing means, and sequence allocation means for forming groups of Nt interleaved bit sequences successively produced by the sequence interleaving means, all sequences of a same group being intended to be transmitted through Nt channels allocated to a same bit rank for all transmitting antennas.

BRIEF DESCRIPTION OF THE DRAWINGS

The characteristics of the invention mentioned above, as well as others, will emerge more clearly from a reading of the following description given in relation to the accompanying figures, amongst which.

DETAILED DESCRIPTION OF THE INVENTION

Figure 1:
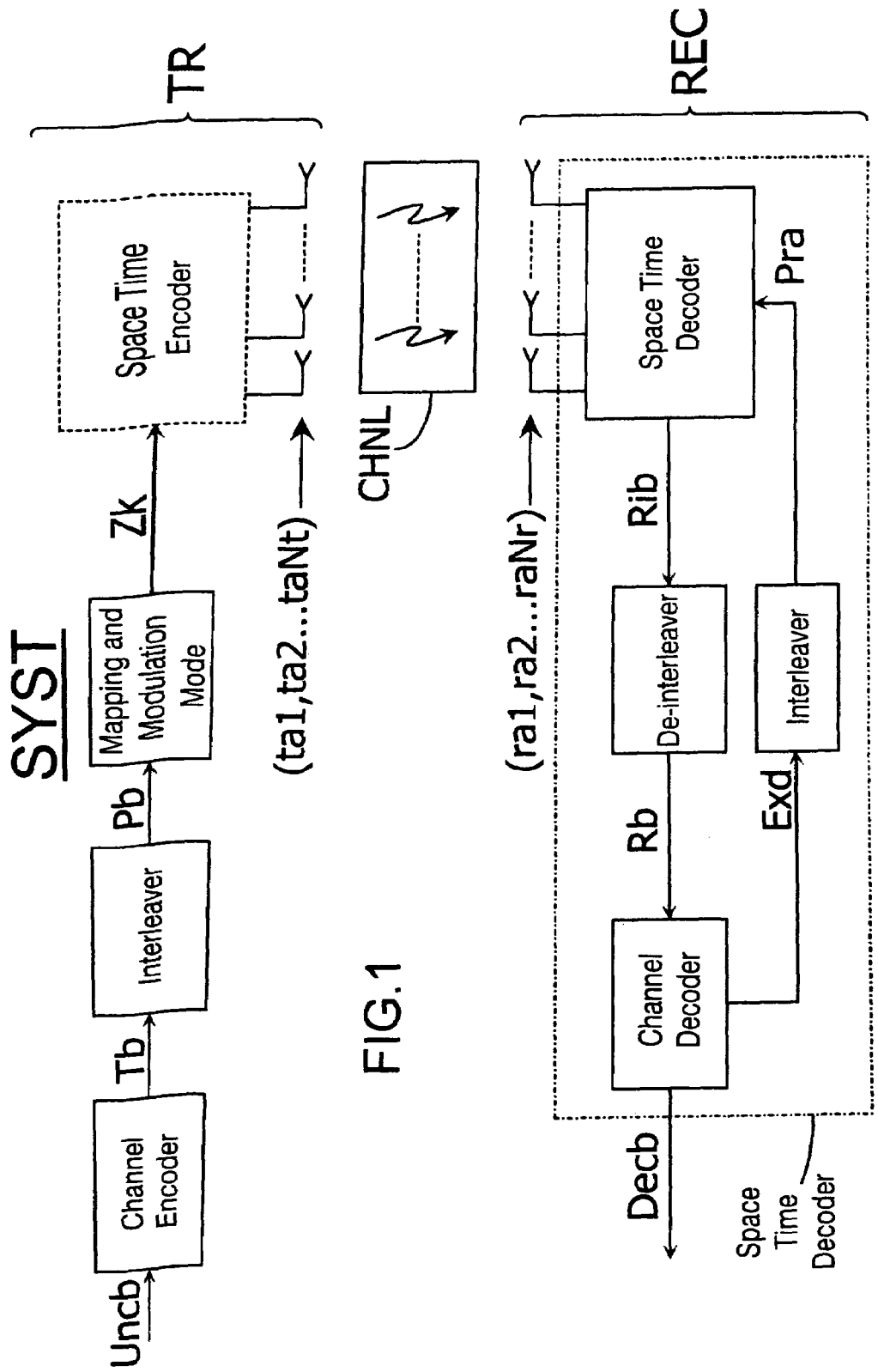
FIG. 1 is a block diagram showing a highly simplified MIMO telecommunication system in which the invention is to be used.

FIG. 1 diagrammatically shows a telecommunication system including at least one transmitter TR and one receiver REC, intended to exchange signals through multiple communication channels CHNL established between a predetermined integer number Nt of transmitting antennas (ta1, ta2 . . . taNt) and a predetermined integer number Nr of receiving antennas (ra1,ra2 . . . raNr).

The transmitter TR shown in the example depicted here includes a channel encoder CHENC intended to apply an encoding, e.g. by means of a convolutional code or of a turbo code, to uncoded data bits Uncb, and to provide a binary stream of encoded data bits Tb to be transmitted. The transmitter TR includes interleaving means INTL intended to generate permutated bits Pb, such an interleaving being useful for a later processing on the receiver side, since it will allow to obtain uncorrelated data. The permutated bits Pb are to be divided into sequences of M.Nt bits each, which bit sequences are then mapped, i.e. transformed into a series of coded symbols Zk by a mapping and modulation module MAPMD, each symbol Zk thus being represented by M successive bits. Successive symbols Zk may then be fed via an unshown transmitting RF module to the Nt transmitting antennas (ta1,ta2 . . . taNt), in which case the communication channels CHNL will feature a number Ni=M.Nt of inputs. Alternatively, the coded symbols Zk may be fed to an optional space-time encoder SPTENC, which is shown here in dashed lines and is to perform an additional processing of the coded symbols Zk before their transmission. The optional space-time encoder SPTENC may, for example, carry out a space-time encoding step in the course of which K successive M-bit symbols Zk (for k=1 to K) are to be combined together before transmission by means of the Nt transmitting antennas (ta1,ta2 . . . taNt), in which case the communication channels CHNL will feature a number Ni=M.K of inputs. A suitable combination of K successive M-bit symbols Zk may for example consist in a linear combination obtained by multiplying a vector representing said successive symbols Zk by a space-time encoding matrix.

The receiver REC shown in the example depicted here includes a space-time decoder SPTDEC intended to produce decoded data bits Decb which should ultimately correspond to the originally uncoded data bits Uncb. This space-time decoder SPTDEC includes a space-time detector DET intended to process data carried by signals received by means of the receiving antennas (ra1,ra2 . . . raNr), and to produce likelihood values Rib related to estimates of the transmitted permutated bits Pb, which likelihood values are intended to be de-interleaved by a de-interleaver DINTL which is to output soft likelihood values Rb related to estimates of bits included in the binary stream of encoded data bits Tb. A bit decoder included in the receiver REC, further referred to as channel decoder CHDEC, is intended to generate the decoded data bits Decb on the basis of said likelihood values Rb.

According to a loop structure commonly used in the art, the space-time detector DET will make use of a priori information Pra generated in the course of previous decoding steps, and issued in the form of extrinsic information Exd by the channel decoder CHDEC through interleaving means INTR, which interleaving means are identical to the interleaving means INTL included in the transmitter TR.

The inventors have observed that increasing the diversity of the data transmitted through the multiple communication channels CHNL established between the transmitting and receiving antennas (ta1,ta2 . . . taNt) and (ra1,ra2 . . . raNr) enables the space-time decoder SPTDEC to converge towards more reliable estimates of the coded bits on the basis of which said data has been generated. The inventors have thus aimed at maximizing the time-related diversity of the data transmitted over the transmitting antennas (ta1, ta2 . . . taNt).

Figure 2:
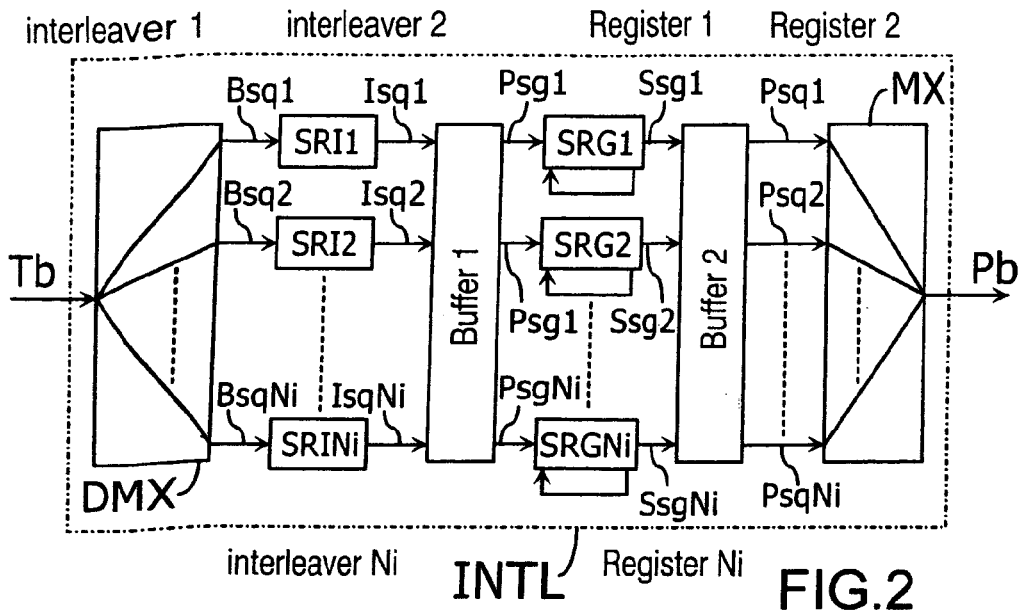
FIG. 2 is a block diagram showing interleaving means comprised in a transmitter included in a MIMO telecommunication system according to the invention.

FIG. 2 depicts bit interleaving means INTL which enable to obtain such an increased diversity. In this specific embodiment of the invention, the bit interleaving means INTL include:

bit demultiplexing means DMX for extracting from the encoded data bits Tb a plurality Ni of bit sequences Bsq1 . . . BsqNi, each sequence Bsqi (for i=1 to Ni) corresponding to one channel input, i.e. to one bit to be transmitted by one of the Nt transmitting antennas described above, or to one of the M bits representing one of the K successive symbols to be combined together in the course of a later space-time encoding step, said bit demultiplexing means DMX being adapted for placing each jth encoded bit, modulo Ni, in a corresponding Njth bit sequence, sequence interleaving means SRI1 . . . SRINi for permutating the bits of each bit sequence Bsq1 . . . BsqNi produced by the demultiplexing means DMX, and sequence allocation means for forming groups of Nt interleaved bit sequences successively produced by the sequence interleaving means SRI1 . . . SRINi, all sequences of a same group being intended to be transmitted through Nt channels allocated to a same bit rank for all transmitting antennas.

In this embodiment of the invention, the bit interleaving means INTL further include:

sequence storing and segmenting means for memorizing all permutated sequences Isq1 . . . IsqNi produced by the sequence interleaving means SRI1 . . . SRINi and dividing each sequence Isqj into successive segments Psgj having each a predermined length of Ni bits in this embodiment of the invention, and segment permutation means for simultaneously permutating segments Psg1 . . . PsgNi of different permutated sequences Isq1 . . . IsqNi produced by the sequence storing and segmenting means BUF1, so that two bits having identical positions within two respective segments included in any group of Ni segments, e.g. bits 25 and 26 in the first two segments of sequences Isq1 and Isq2 included in a first group of Ni segments as shown in the next Figure, end up having differentiated bit positions in corresponding respective permutated segments, which is obtained in this example by applying circular shifts to said segments so that each resulting shifted segment Ssgj (for j=1 to Ni) ends up shifted by one bit with respect to its adjacent segments Ssgj−1 and Ssgj+1.

The sequence interleaving means SRI1 . . . SRINi will preferrably be constituted by Ni identical interleaving modules arranged in parallel as shown here.

In this specific embodiment of the invention, the sequence storing and segmenting means are constituted by a first buffer BUF1 and the sequence permutation means include a parallel array of Ni circularly shiftable registers SRG1 . . . SRGNi respectively intended to store successive series of segments Psg1 . . . PsgNi simultaneously produced by said buffer BUF1. The contents of one of these registers, in this example SRG1, will remain unchanged, while the contents of each jth other register SRGj (for j=2 to Ni) will be submitted to a circular shift of (j−1) bits.

In this specific embodiment of the invention, the sequence allocation means included in the bit interleaving means INTL include a second buffer BUF2 which is adapted to receive and to store successive series of shifted segments Ssg1 . . . SsgNi and to reassemble all shifted segments Ssgj related to a same initial permutated sequence Isqj (for j=1 to Ni) into an interleaved sequence Psqj, the bit interleaving means INTL further including multiplexing means MX intended to receive all interleaved sequences Psqj delivered by the sequence allocation means BUF2 and to multiplex said interleaved sequences Psqj in order to form the stream of permutated bits Pb intended to be fed to the mapping and modulation module described in the previous Figure.

In alternative embodiments of the invention, the segments Ssg1 . . . SsgNi may be sent in parallel to multiple antenna-specific mapping and modulation modules before their transmission by the respective antennas associated with said modules.

Figure 3:
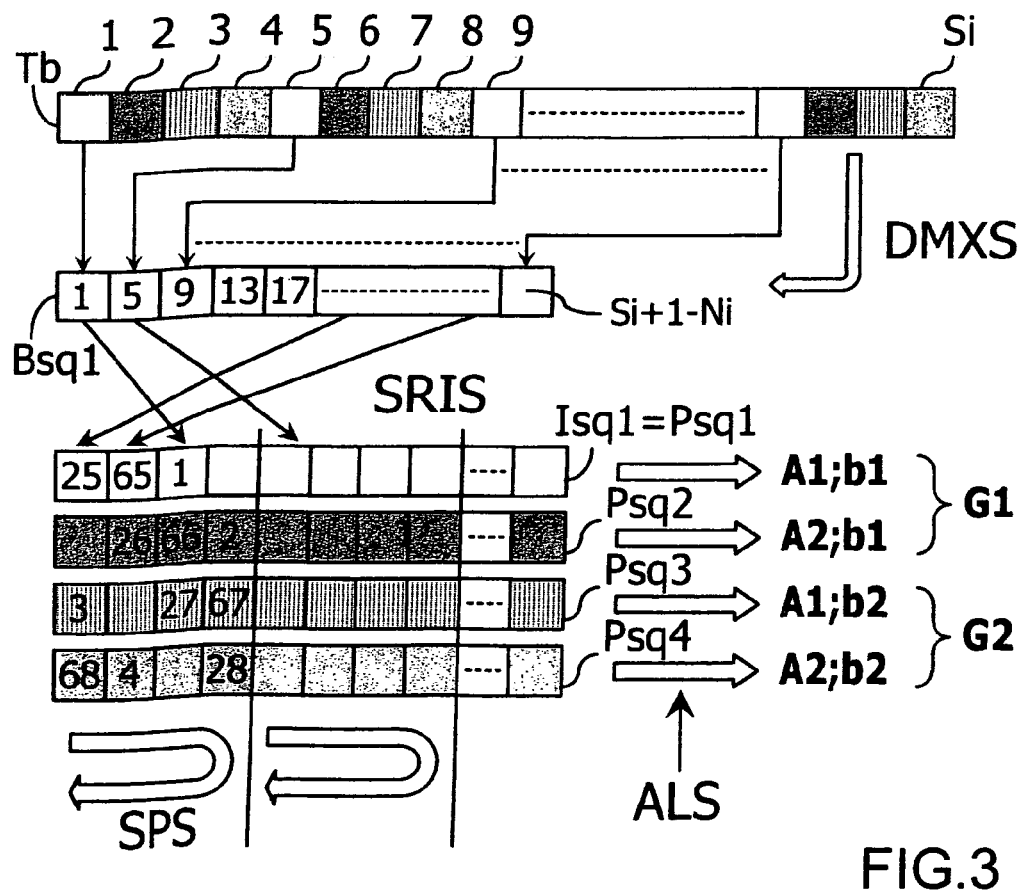
FIG. 3 is a diagram showing how such an interleaver operates.

FIG. 3 illustrates the operation of the bit interleaving means described above, in a specific embodiment of the invention where the transmitter includes Nt=2 transmitting antennas, the symbols to be transmitted being mapped on two bits b1 and b2, so that M=2 and Ni=4.

During a bit demultiplexing step DMXS, a plurality of bit sequences of which only bit sequence Bsq1 is shown here, is extracted from a frame Tb of Si successive encoded data bits referenced 1, 2, 3, 4, 5, 6, 7, 8, 9 . . . Si. The bits intended to form bit sequence Bsq1 are shown in white on this drawing, other bits intended to form part of three other sequences corresponding each to another one of the channel inputs being shown in a three different shades of grey. Each bit sequence Bsqj (for j=1 to Ni=4) thus includes Si/Ni bits referenced j, 4+j, 8+j, 12+j, 16+j . . . Si+j−Ni.

During a sequence interleaving step SRIS, the Si/Ni bits of each bit sequence Bsqj produced by the demultiplexing step DMXS are then permutated, only the permutation of bit sequence Bsq1 resulting in a permutated bit sequence Isq1 being shown here.

In the example depicted here, the sequence interleaving step SRIS is carried out in such a way that Li successive encoded bits 1, 5, 9, 13, 17, etc. end up included in Li different segments of length Ni after execution of the sequence interleaving step SRIS.

During a sequence storing and segmenting step each permutated sequence Isqj (for j=1 to 4) produced by the sequence interleaving step SRIS is then memorized in a buffer and divided into successive segments having each a predermined length equal to Ni=4 in this example.

During a segment permutation step SPS, circular shifts of j−1 bits are then simultaneously applied in parallel to Ni different segments Psgj (for j=2 to Ni=4) belonging each to one of the permutated sequences Isqj produced by the interleaving step SRIS, so that each resulting shifted segment Ssgj ends up shifted by one bit with respect to its adjacent segments Ssgj−1 and Ssgj+1. In this embodiment of the invention, each of the successive segments Psg1 belonging to the permutated sequence Isq1 produced by the interleaving step SRIS will remain unchanged during each segment permutation step SPS.

As can be seen in this Figure, the demultiplexing step DMXS and shifting step SRGS carried out in the method according to the invention enable to place consecutive encoded bits, for example the bits referenced 25, 26, 27 and 28, over different symbol periods. An allocation step ALS carried out by rearranging the contents of the above mentioned second buffer intended to store and concatenate all shifted segments ensures that groups G1 and G2 each including Nt=2 interleaved bit sequences successively produced by the sequence interleaving step are allocated to a same bit, respectively b1 and b2 for both transmitting antennas A1 and A2.

The allocation step enables an essentially homogeneous distribution of the encoded data bits over the various bits to be transmitted by the different transmitting antennas, which ensures that successive bits, for example the bits referenced 25, 26, 27 and 28, will be transmitted over different channels, and thus favours data diversity as perceived at the receiver end of a telecommunication system in which a method according to the invention is used.

The sequence interleaving step SRIS additionally enables optimal de-correlation of successive uncoded bits, which might otherwise stay linked together in cases where the bit encoding technique makes use of a convolutional code, according to which technique a same uncoded information bit is involved in the generation of L.n successive encoded bits, n being the number of encoded bits delivered by a convolutional channel encoder when said encoder is fed with a given number k of successive uncoded bits and L being the code constraint length. The inventors have observed that the use of such a variant of the invention may enable an essentially homogeneous distribution on all transmitting antennas and a mapping on different symbol periods of (Li−1).Ni+1 consecutive encoded bits if each segment has a length equal to Ni, the number (Li−1).Ni+1 being greater than or equal to L.n provided Li is properly chosen.

Figure 4:
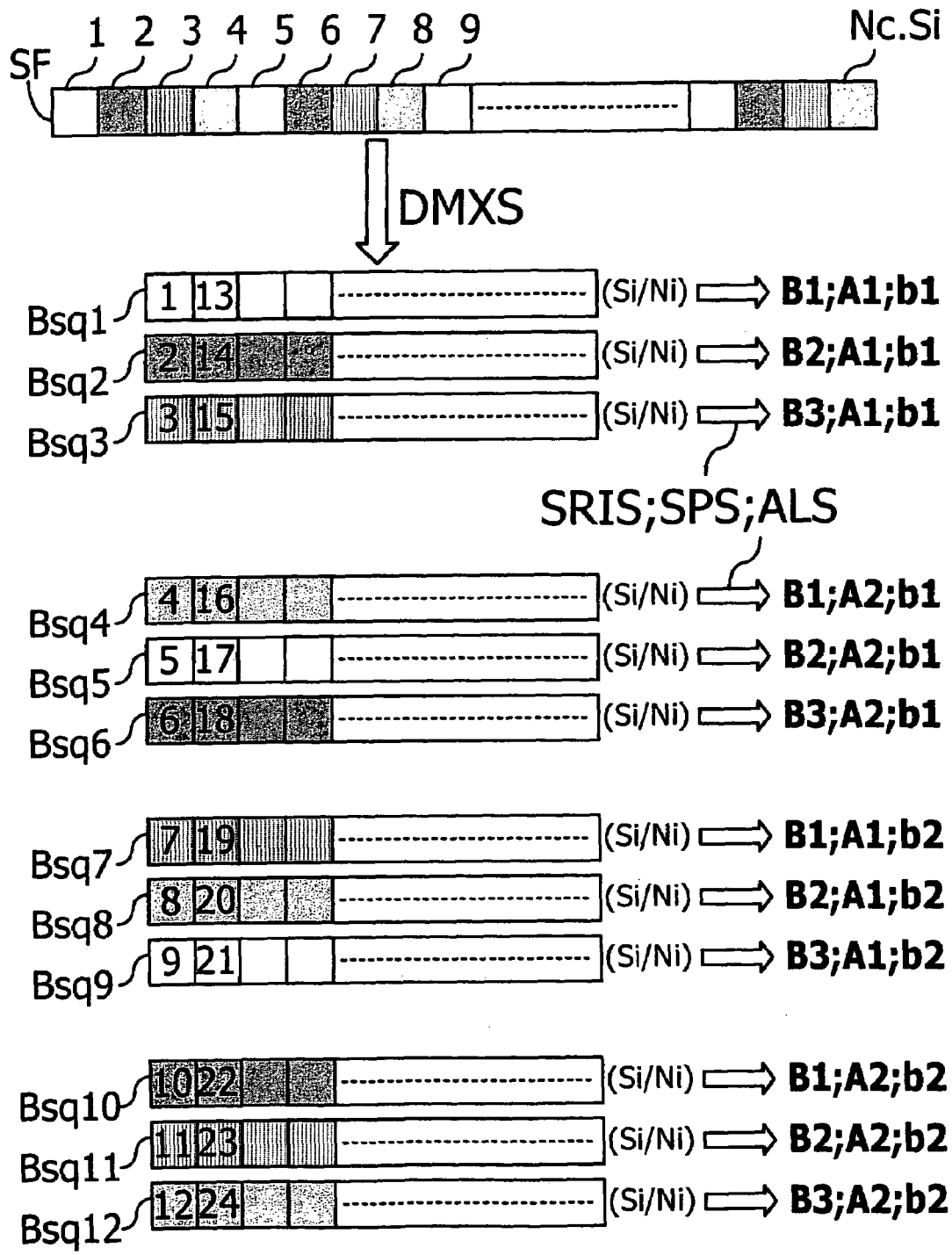
FIG. 4 is a diagram showing a first splitting technique for dispatching a superframe into frames to be processed according to the invention.

FIG. 4 shows another embodiment of the invention where the communication channels are block-fading channels expected to feature Nc successive sets of physical properties, a superframe SF including Nc frames as described above being then intended to be dispatched in the course of a bit demultiplexing step DMXS into Nc blocks of Ni sequences, each sequence including Si bits and being in turn intended to be processed as described above. In the embodiment described here, Nc is chosen equal to 3 and Ni equal to 4 and the superframe SF is summarily dispatched into three blocks of sequences (Bsq1, Bsq4, Bsq7, Bsq10), (Bsq2, Bsq5, Bsq8, Bsq11) and (Bsq3, Bsq6, Bsq9, Bsq12) of Si/Ni bits each, the sequences of each block B1, B2 or B3 being then processed more cautiously by carrying out a sequence interleaving step SRIS, a segment permutation step SPS, and an allocation step ALS. Such a block-per-block processing is preferable since the bits included in sequences belonging to a same block will be able to interfere with each other during a same invariance period of the block-fading channels. Such a simple dispatching of the superframe followed by a more constraining block-per-block processing thus enables optimal allocation of processing ressources.

The dispatching of the superframe SF is carried out in the example depicted in FIG. 4 simply by allocating any two consecutive bits of the superframe SF to two different blocks of sequences B1, B2 or B3.

Figure 5:
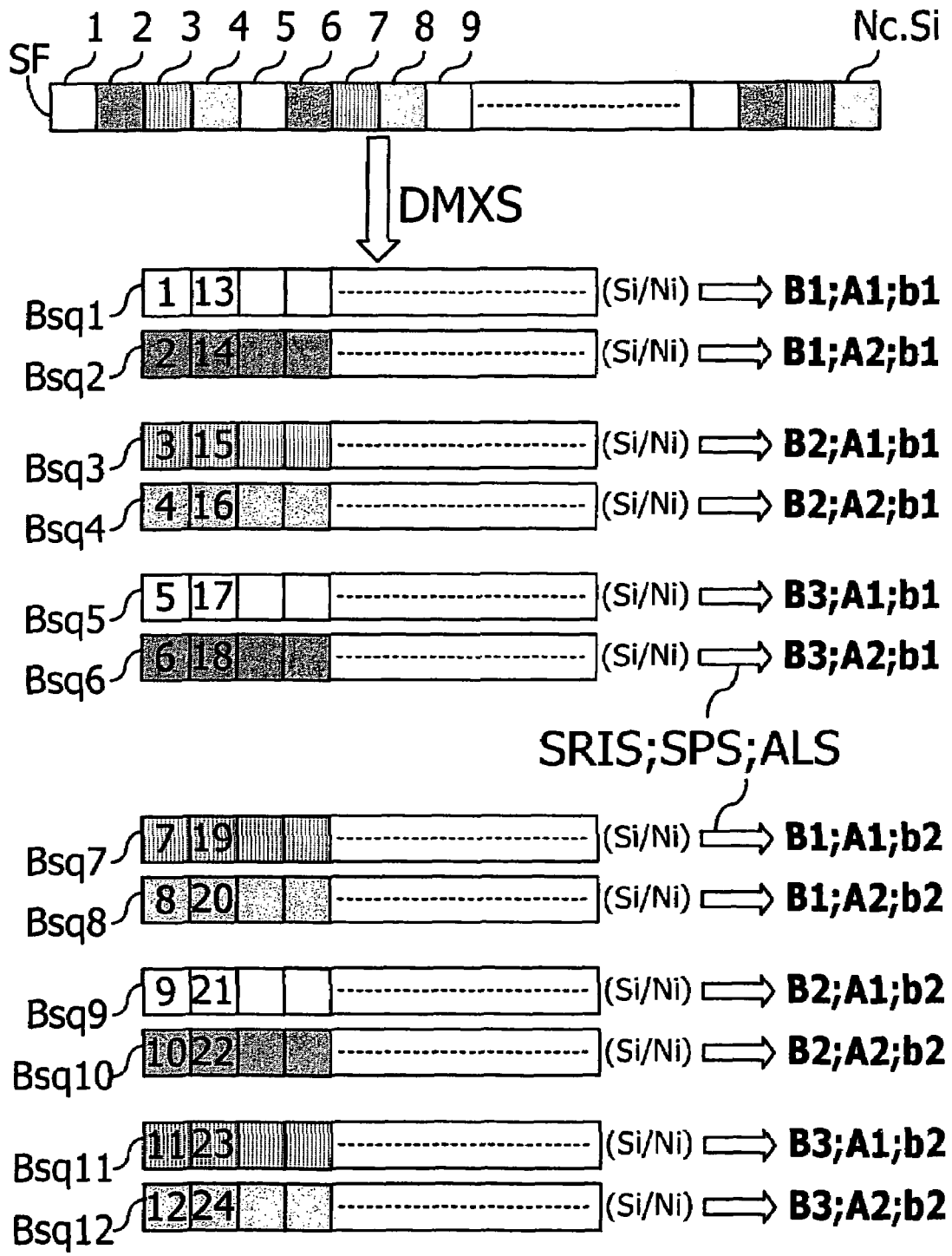
FIG. 5 is a diagram showing a second splitting technique for dispatching a superframe into frames to be processed according to the invention.

As shown in FIG. 5, the dispatching of the superframe SF may also be carried out by allocating any two consecutive bits of the superframe to two different transmitting antennas, A1 or A2 in this example.

Both solutions ensure that the bits included in the superframe SF will be uniformly distributed over all channel realizations, which will enable to preserve the highest possible diversity at the receiver side.

It should be noted here that the bits included in the various sequences should preferably first be dispatched over either the various blocks or the various antennas, before being dispatched over the various bits allocated to said antennas, since the channels corresponding to different blocks or to different antennas are theoretically more different from each other than channels corresponding to different bits to be transmitted over a same antenna and a same block. Attributing a higher priority to a dispatching of successive bits over different blocks or antennas thus enables to optimize the diversity obtained by virtue of the invention.

Figure 6:
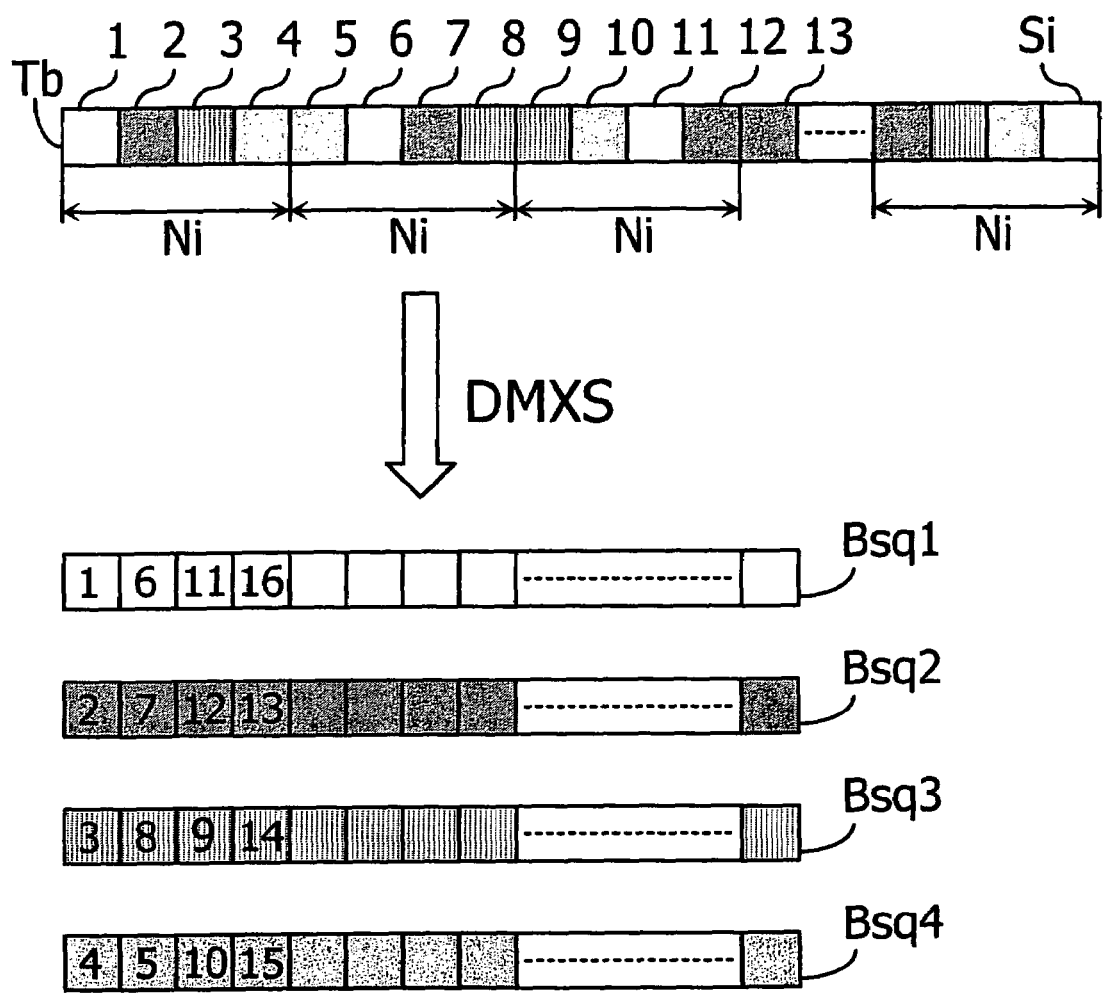
FIG. 6 is a diagram showing a preferred technique for carrying out a bit demultiplexing step according to a variant of the invention.

FIG. 6 shows a preferred embodiment of the demultiplexing step DMXS which is not carried out by simply placing each jth encoded bit of an initial frame, modulo Ni, in a corresponding bit sequence, but instead by placing two encoded bits separated by Ni−1 other encoded bits in different bit sequences, which is obtained in this example by placing an encoded bit of rank j in a bit sequence of rank j+IP(j−1)/Ni), modulo Ni, where IP((j−1)/Ni) represents an integer part of a ratio (j−1)/Ni.

Such an embodiment of the bit demultiplexing step DMXS enables to place consecutive encoded bits over different demultiplexed sequences according to a scheme which is not dictated by a structure of the code used for originally encoding the encoded bits. More particularly, if a specific bit has a high potential for being affected by an encoding error, said specific bit having then a period of occurrence dictated by the code structure, said periodic bit will not always be transmitted through a same channel input, the above described preferred embodiment of the bit demultiplexing step instead ensuring that different occurrences of this periodic bit will be sent through different channel inputs.

The invention claimed is:

1. A method for transmitting data in a telecommunication system including at least one transmitter provided with a plural number Nt of transmitting antennas and at least one receiver provided with at least one receiving antenna, said method including:
generating encoded data bits,
permutating said encoded data bits, and
producing symbols representative of the permutated bits, each symbol being represented by a predetermined number of bits intended to be transmitted over communication channels established between the transmitting and receiving antennas, which channels feature a predefined number Ni of channel inputs,
permutating step includes,
demultiplexing a frame of encoded data bits into a number of bit sequences equal to the predefined number Ni of channel inputs,
permutating the bits of each bit sequence produced by the demultiplexing step, and
forming groups of Nt interleaved bit sequences successively produced by the sequence permutating step, all sequences of a same group being intended to be transmitted through Nt channels allocated to a same bit rank for all transmitting antennas.

2. A method as claimed in claim 1, wherein the sequence permutating step includes:
randomly permutating all bits included in each sequence produced by the demultiplexing step,
storing all permutated sequences produced by the randomly permutating step and dividing said sequences into segments including each a number of bits equal to the predefined number Ni of channel inputs,
simultaneously applying permutations to segments of different permutated sequences produced by the storing and dividing step, so that two bits having identical positions within two respective segments included in any group of Ni segments end up having differentiated bit positions in corresponding respective permutated segments, and
reassembling all shifted segments related to a same initial permutated sequence into an interleaved sequence.

3. A method as claimed in claim 2, wherein the simultaneous applying step is carried out by simultaneously applying circular shifts to segments of different permutated sequences produced by the storing and dividing step, so that each shifted segment ends up shifted by one bit with respect to its adjacent segments.

4. A method as claimed in claim 3, wherein one of the segments of a given permutated sequence produced by the sequence interleaving step remains unchanged during the simultaneous applying step, corresponding segments of each jth other permutated sequence being then simultaneously shifted by j bits.

5. A method as claimed in claim 1 wherein the communication channels feature Nc successive sets of physical properties, and the encoded data bits produced by the generating step form a superframe to be dispatched into Nc blocks of Ni sequences each in the course of the bit demultiplexing step.

6. A method as claimed in claim 5, wherein any two consecutive bits of the superframe will be allocated to two different transmitting antennas.

7. A method as claimed in claim 5, wherein any two consecutive bits of the superframe will be allocated to two different blocks of sequences.

8. A method as claimed in claim 1 wherein the predefined number Ni of channel inputs is chosen equal to a product M.Nt between the number M of bits representative of a symbol and the number Nt of transmitting antennas.

9. A method as claimed in claim 1 wherein the producing step is followed by a space-time encoding step in the course of which bits of K successive symbols are to be combined together before transmission by means of the Nt transmitting antennas, and the predefined number Ni of channel inputs is chosen equal to M.K, where M is the number of bits representative of any given symbol.

10. A method as claimed in claim 1 wherein the bit demultiplexing step is carried out by placing two encoded bits separated by Ni−1 other encoded bits in different bit sequences.

11. A method as claimed in claim 10, wherein the bit demultiplexing step is carried out by placing an encoded bit of rank j in a bit sequence of rank j+IP((j−1)/Ni), modulo Ni, where IP((j−1)/Ni) represents an integer part of a ratio (j−1)/Ni.

12. A telecommunication system comprising:
at least one transmitter provided with a plural number Nt of transmitting antennas and at least one receiver provided with at least one receiving antenna the transmitter including,
bit encoding means for generating encoded data bits,
bit interleaving means for permutating said encoded data bits, and
modulation means for producing symbols representative of the permutated bits, each symbol being represented by a predetermined number of bits intended to be transmitted over communication channels established between the transmitting and receiving antennas, which channels feature a predefined number Ni of channel inputs, wherein the bit interleaving means include,
bit demultiplexing means for dispatching a frame of encoded data bits into a number of bit sequences equal to the predefined number Ni of channel inputs,
sequence interleaving means for permutating the bits of each bit sequence produced by the demultiplexing means, and
sequence allocation means for forming groups of Nt interleaved bit sequences successively produced by the sequence interleaving means, all sequences of a same group being intended to be transmitted through Nt channels allocated to a same bit rank for all transmitting antennas.

13. A telecommunication system as claimed in claim 12, wherein the sequence interleaving means include,
random bit permutation means for randomly permutating all bits included in each sequence produced by the demultiplexing means, sequence storing and segmenting means for memorizing all permutated sequences produced by the random bit permutation means and dividing said sequences into segments including each a number of bits equal to the predefined number Ni of channel inputs, segment permutation means for simultaneously permutating segments of different permutated sequences produced by the sequence storing and segmenting means, so that two bits having identical positions within two respective segments included in any group of Ni segments end up having differentiated bit positions in corresponding respective permutated segments, and concatenation means for reassembling all shifted segments related to a same initial permutated sequence into an interleaved sequence.

14. A communication device comprising:

a plural number Nt of transmitting antennas, bit encoding means for generating encoded data bits, bit interleaving means for permutating said encoded data bits, and modulation means for producing symbols representative of the permutated bits, each symbol being represented by a predetermined number of bits intended to be transmitted over communication channels established between the transmitting and receiving antennas, which channels feature a predefined number Ni of channel inputs, wherein the bit interleaving means include, bit demultiplexing means for dispatching a frame of encoded data bits into a number of bit sequences equal to the predefined number Ni of channel inputs, by placing each jth encoded bit, modulo Ni, in a corresponding Njth bit sequence, sequence interleaving means for permutating the bits of each bit sequence produced by the demultiplexing means, and sequence allocation means for forming groups of Nt interleaved bit sequences successively produced by the sequence interleaving means, all sequences of a same group being intended to be transmitted through Nt channels allocated to a same bit rank for all transmitting antennas.

* * * * *